United States Patent
Filipovich

(10) Patent No.: US 11,836,770 B2
(45) Date of Patent: Dec. 5, 2023

(54) SYSTEMS AND METHODS TO PROCESS EYEWEAR ORDERS

(71) Applicant: Essilor International, Charenton-le-Pont (FR)

(72) Inventor: Michael Filipovich, Dallas, TX (US)

(73) Assignee: Essilor International, Charenton-le-Pont (FR)

(*) Notice: Subject to any disclaimer, the term of this patent is extended or adjusted under 35 U.S.C. 154(b) by 594 days.

(21) Appl. No.: 15/941,742

(22) Filed: Mar. 30, 2018

(65) Prior Publication Data

US 2018/0285948 A1 Oct. 4, 2018

(30) Foreign Application Priority Data

Mar. 30, 2017 (EP) .................................... 17305380

(51) Int. Cl.
*G06Q 30/04* (2012.01)
*G06Q 10/08* (2023.01)
(Continued)

(52) U.S. Cl.
CPC ....... *G06Q 30/04* (2013.01); *G06Q 10/06316* (2013.01); *G06Q 10/08* (2013.01);
(Continued)

(58) Field of Classification Search
CPC .. G06Q 30/04; G06Q 10/06316; G06Q 10/08; G06Q 30/0222; G06Q 30/0635; G06Q 50/04; Y02P 90/30
See application file for complete search history.

(56) References Cited

U.S. PATENT DOCUMENTS 6,058,373 A * 5/2000 Blinn .................. G06Q 10/087
705/22
7,188,082 B2 * 3/2007 Keane ................ G06Q 30/0641
705/26.81
(Continued)

FOREIGN PATENT DOCUMENTS

| CN | 105892089 A | 8/2016 | |
| EP | 2679146 A1 * | 1/2014 | ........... A61B 3/0025 |
| WO | WO 00/60513 A1 | 10/2000 | |

OTHER PUBLICATIONS

M. Kück, et al., "Potential of data-driven simulation-based optimization for adaptive scheduling and control of dynamic manufacturing systems," 2016 Winter Simulation Conference (WSC), Washington, DC, USA, 2016, pp. 2820-2831, doi: 10.1109/WSC.2016. 7822318. (Year: 2016).*

(Continued)

*Primary Examiner* — Crystol Stewart
(74) *Attorney, Agent, or Firm* — Oblon, McClelland, Maier & Neustadt, L.L.P.

(57) ABSTRACT

The disclosed embodiments include systems and methods to process an eyewear order. In one embodiment, the method includes obtaining order information indicative of an order to assemble an eyewear at an eyewear processing facility, where the order is first received at an order origination facility remote from the processing facility. The method also includes determining a status of the order. The method further includes generating an up-to-date invoice of the order if the eyewear is ready for shipping. The method further includes generating an electronic file comprising the order information and the up-to-date invoice of the eyewear.

21 Claims, 3 Drawing Sheets

(51) Int. Cl.
  *G06Q 10/0631* (2023.01)
  *G06Q 30/0207* (2023.01)
  *G06Q 30/0601* (2023.01)
  *G06Q 50/04* (2012.01)

(52) U.S. Cl.
  CPC ..... *G06Q 30/0222* (2013.01); *G06Q 30/0635* (2013.01); *G06Q 50/04* (2013.01); *Y02P 90/02* (2015.11); *Y02P 90/30* (2015.11)

(56) References Cited

U.S. PATENT DOCUMENTS

| | | | | |
|---|---|---|---|---|
| 2003/0083765 A1* | 5/2003 | Nonaka | ........... | G06Q 10/06 700/99 |
| 2004/0015412 A1* | 1/2004 | Shinbo | ........... | G06Q 30/0631 705/26.41 |
| 2004/0083020 A1* | 4/2004 | Gueugnaut | ........... | G06Q 10/08 700/115 |
| 2005/0156035 A1* | 7/2005 | Gyi | ........... | G06Q 10/087 235/385 |
| 2006/0058002 A1* | 3/2006 | Bachelder | ........... | G08G 1/20 455/344 |
| 2006/0074729 A1* | 4/2006 | Capotosto | ........... | G06Q 10/087 705/7.12 |
| 2006/0220865 A1* | 10/2006 | Babine | ........... | G06Q 10/06 340/572.1 |
| 2008/0218354 A1* | 9/2008 | Lorentz | ........... | G06K 7/0008 340/572.1 |
| 2009/0261165 A1* | 10/2009 | Goh | ........... | G06Q 10/06 235/385 |
| 2012/0207922 A1* | 8/2012 | Iwata | ........... | G02C 7/102 427/162 |
| 2015/0339760 A1* | 11/2015 | Araque | ........... | G06Q 30/0633 705/26.8 |
| 2015/0363853 A1* | 12/2015 | Werzer | ........... | A61B 3/111 705/26.5 |
| 2016/0063770 A1* | 3/2016 | Bowers | ........... | B07C 3/14 156/64 |
| 2016/0171596 A1* | 6/2016 | Angerbauer | ........... | A61B 3/111 705/27.2 |
| 2018/0081345 A1* | 3/2018 | Mailman | ........... | G05B 19/41865 |
| 2018/0218354 A1* | 8/2018 | Kumar | ........... | G06Q 20/102 |
| 2018/0270109 A1* | 9/2018 | Hollis | ........... | H04L 41/0803 |
| 2019/0188622 A1* | 6/2019 | Filipovich | ........... | G06Q 50/04 |
| 2019/0272419 A1* | 9/2019 | Reihl | ........... | G06F 40/106 |

OTHER PUBLICATIONS

Combined Chinese Office Action and Search Report dated Dec. 14, 2021 in Chinese Patent Application No. 2018102797.5 (with English translation), 25 pages.

\* cited by examiner

SYSTEMS AND METHODS TO PROCESS EYEWEAR ORDERS

BACKGROUND

The present disclosure relates generally to systems and methods to process eyewear orders.

Eyewear orders are often submitted at storefronts, optometrist offices, at homes via the internet, or at facilities where eye product orders are placed (collectively referred to as "origination facility") and assembled at remote processing facilities. Such eyewear orders often include customer information, product specification, pricing information, delivery information, as well as other information associated with one or more of the eyewear orders. As operations of some eyewear manufacturers have expanded, the eyewear orders may be routed from origination facilities to one or more internal servers of such manufacturers before they are received by the processing facilities of such manufacturers. The processing facilities, upon receipt of eyewear orders, assemble the eyewear orders, generate invoices, and transmit the generated invoices along the one or more internal servers, back to the origination facilities.

The foregoing process is tedious, resource inefficient, and error prone. For example, pricing information of an eyewear may have changed from the time an eyewear order for the eyewear is generated at an origination facility to the time the eyewear is assembled at a processing facility. As such, an invoice of the eyewear product that relies on the pricing information provided by the origination facility would be inaccurate.

BRIEF SUMMARY OF THE DISCLOSED EMBODIMENTS

The disclosed embodiments provide systems and methods to process eyewear orders. In accordance with one embodiment, a computer-implemented method to process of an order to assemble eyewear is provided. The method includes obtaining order information indicative of an order to assemble an eyewear at an eyewear processing facility, where the order is first received at an order origination facility remote from the processing facility. The method also includes determining a status of the order. The method further includes generating an up-to-date invoice of the order if the eyewear is ready for shipping. The method further includes generating an electronic file comprising the order information and the up-to-date invoice of the eyewear.

In accordance with another illustrative embodiment, an order processing system is provided. The order processing system includes a storage medium comprising order information indicative of an order to assemble an eyewear at an eyewear processing facility. The order processing system also includes a processor operable to determine a status of the order. The processor is also operable to query at least one remote system communicatively connected to the order processing system to obtain up-to-date pricing information of the eyewear. The processor is further operable to generate an up-to-date invoice of the order based on the up-to-date pricing information if the eyewear is ready for shipping. The processor is further operable to generate an electronic file comprising the order information and the up-to-date invoice of the eyewear. The processor is further operable to provide the electronic file to an order origination facility where the order is first received.

In accordance with a further illustrative embodiment, a non-transitory machine-readable medium including instructions stored therein, which when executed by one or more processors, causes the one or more processors to perform operations to process eyewear orders is provided. The instructions include instructions to obtain a first order information indicative of a first order to assemble a first eyewear at an eyewear processing facility, wherein the first order is first received at a first order origination facility remote from the processing facility. The instructions also include instructions to obtain a second order information indicative of a second order to assemble a second eyewear at the eyewear processing facility, wherein the second order is first received at a second order origination facility remote from the first order origination facility and the first order processing facility. The instructions further include instruction to determine statuses of the first order and the second order. The instructions further include instructions to generate a first invoice of the first order if the first eyewear is ready for shipping. The instructions further include instructions to generate a second invoice of the second order if the first eyewear is ready for shipping. The instructions further include instructions to generate a first and a second electronic file comprising the order information and the first invoice and the second invoice, respectively. The instructions further include instructions to arrange a processing queue of the first order relative to the second order based on the status and the order information of the first order relative to the second order.

Additional details of the disclosed embodiments are provided below in the detailed description and corresponding drawings.

BRIEF DESCRIPTION OF THE DRAWINGS

Illustrative embodiments of the present invention are described in detail below with reference to the attached drawing Figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

Figure 1:
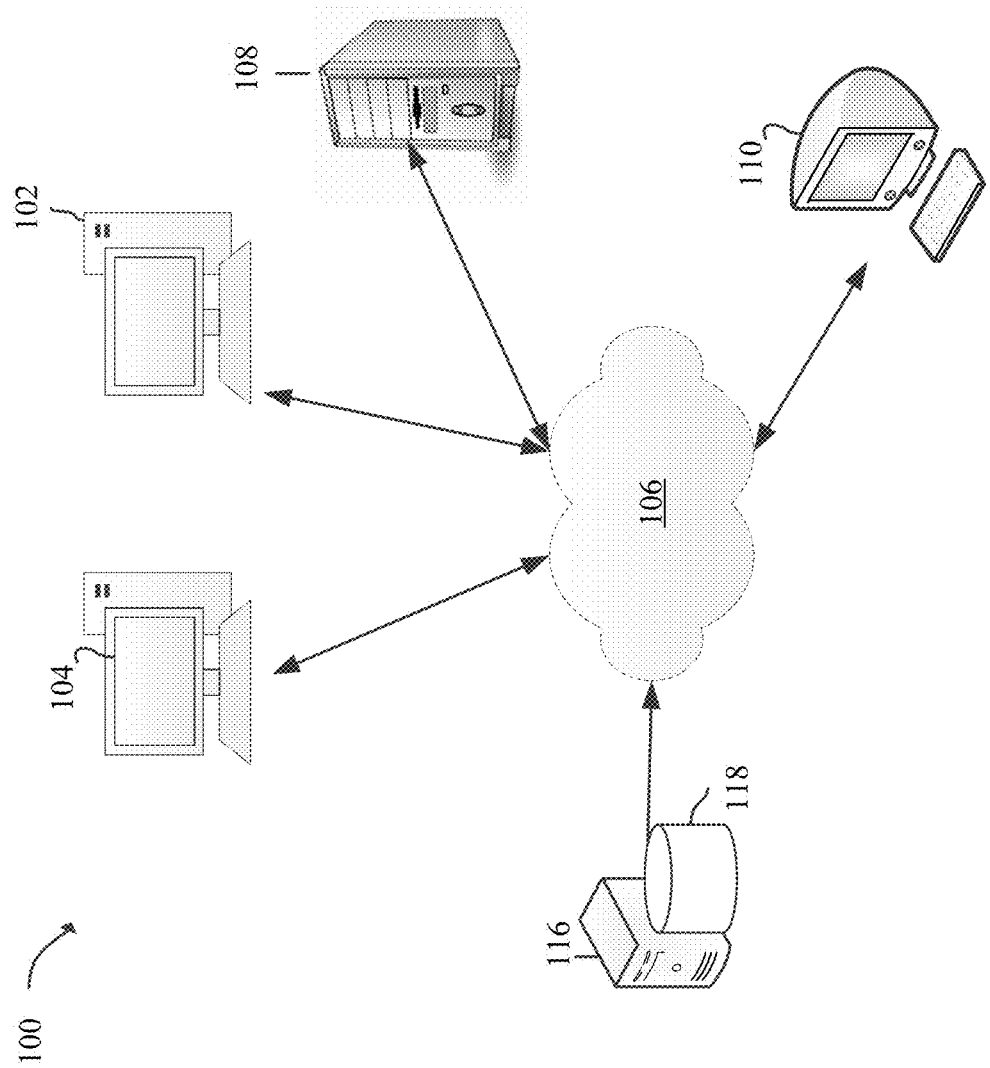
FIG. 1 is a network environment for processing eyewear orders in accordance with one embodiment.

FIG. 1 is a network environment 100 for processing eyewear orders in accordance with one embodiment. The network environment 100 includes a first electronic device 102 operable to provide order information associated with product orders received at a first origination facility to an order processing system 116 via network 106 and a second electronic device 104 operable to provide order information associated with product orders received at a second origination facility to the order processing system 116 via the network 106. As defined herein, order information includes any information indicative of an eyewear product order, such as an order number, order date, account number, customer name, customer address, customer telephone number, customer username, lens style, lens color, lens material, frame composition, frame identification, courier identification, as well as other relevant information indicative of the product order.

The order processing system 116 may be formed by one or more server computers, desktop computers, laptop computers, tablet devices, smartphone devices, PDAs, similar electronic devices, the combination thereof, or a component thereof having a processor (not shown) and operable to process product orders described herein. When the order processing system 116 receives order information indicative of an order to assemble an eyewear product ("eyewear order"), the order processing system 116 checks the status of the eyewear order. In some embodiments, if the order processing system 116 determines that the process to assemble the eyewear order has not begun, then the order processing system 116 is operable to provide instructions to one or more operators at the processing facility to begin assembling the eyewear product. In one of such embodiments, the order processing system 116 is operable to automatically obtain components of the eyewear product and begin assembling the eyewear product. For example, the order processing system 116 is operable to control a conveyor belt to transport components of the eyewear product to a processing point within the processing facility to assemble the eyewear product. In one or more further embodiments, the order processing system 116 is operable to determine a scheduled completion date and is operable to change the queue position of the eyewear product in order to meet the scheduled completion date of the eyewear order. Additional descriptions of operations performed by the order processing system 116 to arrange/rearrange the queue position of the eyewear product are provided in the paragraphs below.

In some embodiments, the order processing system 116 may generate an identifier ("label") used to identify an eyewear order while the corresponding eyewear product is being assembled. The label may include optical machine-readable representations such as, symbologies of numeric-only barcodes, alpha-numeric barcodes, and 2-dimensional barcodes, such as, codabar barcodes, UPC-A barcodes, UPC-E barcodes, Postal Numeric Encoding Technique barcodes, and quick response codes, as well as other types of identification information that provide an identification of the eyewear order. The label may also include additional information about the eyewear order, such as the name of the eyewear wearer, account number of the wearer, address of the wearer, specific requirements made by the wearer, lens style of the eyewear, lens color of the eyewear, lens coating of the eyewear, lens material of the eyewear, country of origin of the materials of the eyewear, Rx specifications (including the wearer's sphere power, the wearer's cylinder power, the wearer's cylinder axis, the wearer's addition power, the lens base curve, as well as other specification of the wearer's lens), frame measurements, frame model, frame manufacturer, frame color, courier name, identification of a tray holding components of the eyewear, shipping bin location, as well as other information that may help operators to identify the eyewear order and materials needed to complete the eyewear order. In one of such embodiments, the order processing system 116 generates a physical copy of the label and automatically places the physical copy of the label or instructs an operator to place the physical copy of the label proximate to components of the eyewear order to facilitate identification and tracking of the eyewear order during the assembling process. In some embodiments, the order processing system 116 is operable to generate an indication of a current condition of the eyewear product. In one of such embodiments, the order processing system 116 is operable to provide the current condition of the eyewear product via the network 106 to an electronic device deployed at an origination facility of the order for the eyewear product.

Some of the order information obtained by the order processing system 116 may not be up-to-date. In that regard, the order processing system 116 is operable to query the first electronic device 102, the second electronic device 104, and/or a third-party system 110 to determine whether the order information for the eyewear product is up-to-date. In some embodiments, the third-party system 110 represents any external system operable to provide promotional discounts, rebates, charges, taxes, courier costs, price adjustments as well as other updates to the order information. In one of such embodiments, the third-party system 110 represents a system of a third-party eyewear frames vendor that supplies frames used in the eyewear product. Moreover, the third-party system 110 is operable to provide up-to-date rebates and promotional discounts on the frames used in the eyewear product to the order processing system 116. The order processing system 116 receives a predetermined price ("base price") obtained from the origination facility that generated the eyewear order, and separately obtains applicable rebates and promotional discounts and applies the rebates and promotional discounts that are valid at the time the eyewear product is ready to be shipped, or at another predetermined timeframe from the third party system 110. In one or more embodiments, the third-party system 110 represents an accounting system operable to determine applicable taxes that should be applied to the eyewear product based on the location of the wearer of the eyewear product. The order processing system 116 is then operable to apply price adjustments to the base price of the eyewear product and generate an up-to-date invoice of the eyewear product. In one or more embodiments, the third party system 110 processes credit cards and the order processing system 116 is operable to request the third party system 110 to verify credit card information of the customer of the eyewear order.

The order processing system 116 is further operable to generate an electronic file containing the updated pricing information of the eyewear product as well as the order information. In some embodiments, the electronic file has a predetermined format that is compatible with electronic devices deployed at an origination facility that transmitted the eyewear order. In further embodiments, the electronic file may be formatted in different formats that are compatible with different electronic devices deployed at the origination facility that transmitted the eyewear order. In further embodiments, the electronic file may be formatted in accordance to a preferred formatting of an operator of the processing facility, an employee of an origination facility, or a customer of the eyewear product. In further embodiments, the electric file may be provided for display on an electronic display deployed at the processing facility to provide operators working at the processing facility with up-to-date status and order information of the eyewear order. In some embodiments, the order processing system 116 is operable to include additional information associated with the eyewear order or the customer in the electronic file. In one of such embodiments, the order processing system 116 obtains prescription information of the wearer of the eyewear product and formats the electronic file associated with the eyewear product to include prescription information of the wearer. In some embodiments, the order processing system 116 transmits a copy of the electronic file to an electronic device such as the first and/or second electronic device 102 and 104 that is deployed at the origination facility. The order processing system 116 may also store a copy of the generated electronic file on a storage medium such as storage medium 118.

In some embodiments, multiple eyewear orders are transmitted to the order processing system 116. In one of such embodiments, a first eyewear order is transmitted from the first electronic device 102 and a second eyewear order is transmitted from the second electronic device 104. In one of such embodiments, the order processing system 116 is operable to determine which of the two orders should be processed first and is operable to arrange a processing queue for the two eyewear orders. The processing queue may be arranged based on the receipt dates of the eyewear orders, the due dates of the eyewear orders, shipping time, current backlog eyewear orders scheduled to be assembled at the processing facility, availability of eyewear components used to assemble eyewear products specified in the eyewear orders, operator instructions, as well as other rules for arranging eyewear order queue positions. Similarly, the order processing system 116 is operable to arrange multiple eyewear orders received from electronic devices deployed at the same origination facility in a predetermined queue to process the received orders.

In some embodiments, electronic files containing order and pricing information are not directly transmitted from the order processing system 116 to the first or the second electronic devices 102 or 104, or to another electronic device of an origination facility. For example, electronic files may be transmitted from the order processing system 116 to server 108 for forwarding to an electronic device of the origination facility. The server 108 may be any system or device having a processor, a memory, and operable to perform communications operations to transmit data between the order processing system 116 and electronic devices of one or more origination facilities communicatively connected to the order processing system 116 via the network 106. In some embodiments, server 108 represents multiple server systems, each forming a node of the server 108. In one of such embodiments, order information and electronic files are transmitted along multiple nodes of the server 108 that communicatively connects the order processing system 116 to electronic devices of one or more origination facilities.

In some embodiments, the server 108 is operable to back-up order information and electronic files transmitted between the order processing system 116, electronic devices of the one or more origination facilities, and/or the third-party system 110 on storage medium 118 or another storage medium that is communicatively connected to the order processing system 116. In that regard, the storage medium 118 may be a component of the order processing system 116 or may be communicatively connected to the order processing system 116. The storage medium 118 is formed from data storage components such as, but not limited to, read-only memory ("ROM"), random access memory ("RAM"), flash memory, magnetic hard drives, solid state hard drives, CD-ROM drives, DVD drives, floppy disk drives, as well as other types of data storage components and devices. In some embodiments, the storage medium 118 includes multiple data storage devices. In further embodiments, the multiple data storage devices may be physically stored at different locations.

The storage medium 118 includes status information of eyewear products assembled at the processing facility. The storage medium 108 also includes business rules for processing orders to assemble eyewear products as well as other business rules described herein. The storage medium 118 further includes instructions, which when performed by a processor, such as the processor of the order processing system 116, causes the processor to obtain order information indicative of multiple orders to assemble multiple eyewear products at the processing facility, where the orders originate from different origination facilities remote from the processing facility, determine statuses of each of the eyewear orders, generate invoices for each of the eyewear orders upon determining that the respective eyewear order is ready for shipping, and generate electronic files for each of the eyewear orders. Additional data and instructions stored in the storage medium 118 are described herein and are illustrated in at least FIGS. 2 and 3.

The network 106 can include, for example, any one or more of a cellular network, a satellite network, a personal area network ("PAN"), a local area network ("LAN"), a wide area network ("WAN"), a broadband network ("BBN"), the Internet, and the like. Further, the network 106 can include, but is not limited to, any one or more of the following network topologies, including a bus network, a star network, a ring network, a mesh network, a star-bus network, tree or hierarchical network, or similar network architecture. In some embodiments, the network 106 includes a wired or wireless networking device (not shown) operable to facilitate communication between the first and second electronic devices 102 and 104, the server 108, the third-party system 110, and the order processing system 116. Examples of the networking device include, but are not limited to, wired and wireless routers, wired and wireless modems, access points, as well as other types of suitable networking devices described herein.

Although FIG. 1 illustrates a single processing system 116 that is communicatively connected to the first and second electronic devices 102 and 104 deployed at the first and the second origination facilities, additional processing systems (not shown), additional electronic devices (not shown) deployed at other origination facilities, and additional third party systems (not shown) may also be communicatively connected to the order processing system 116 via the network 106. Further although the order processing system 116 is depicted to transmit order and invoice information to electronic devices deployed at one or more origination facilities, the order processing system 116 may also directly transmit order and invoice information to customers, thereby providing customers with up-to-date information on the status and cost of their orders. Further, although certain paragraphs herein describe eyewear products, one of ordinary skill would understand that the systems and methods described herein are operable to process orders to assemble different types of (both eyewear and non-eyewear) products.

Figure 2:
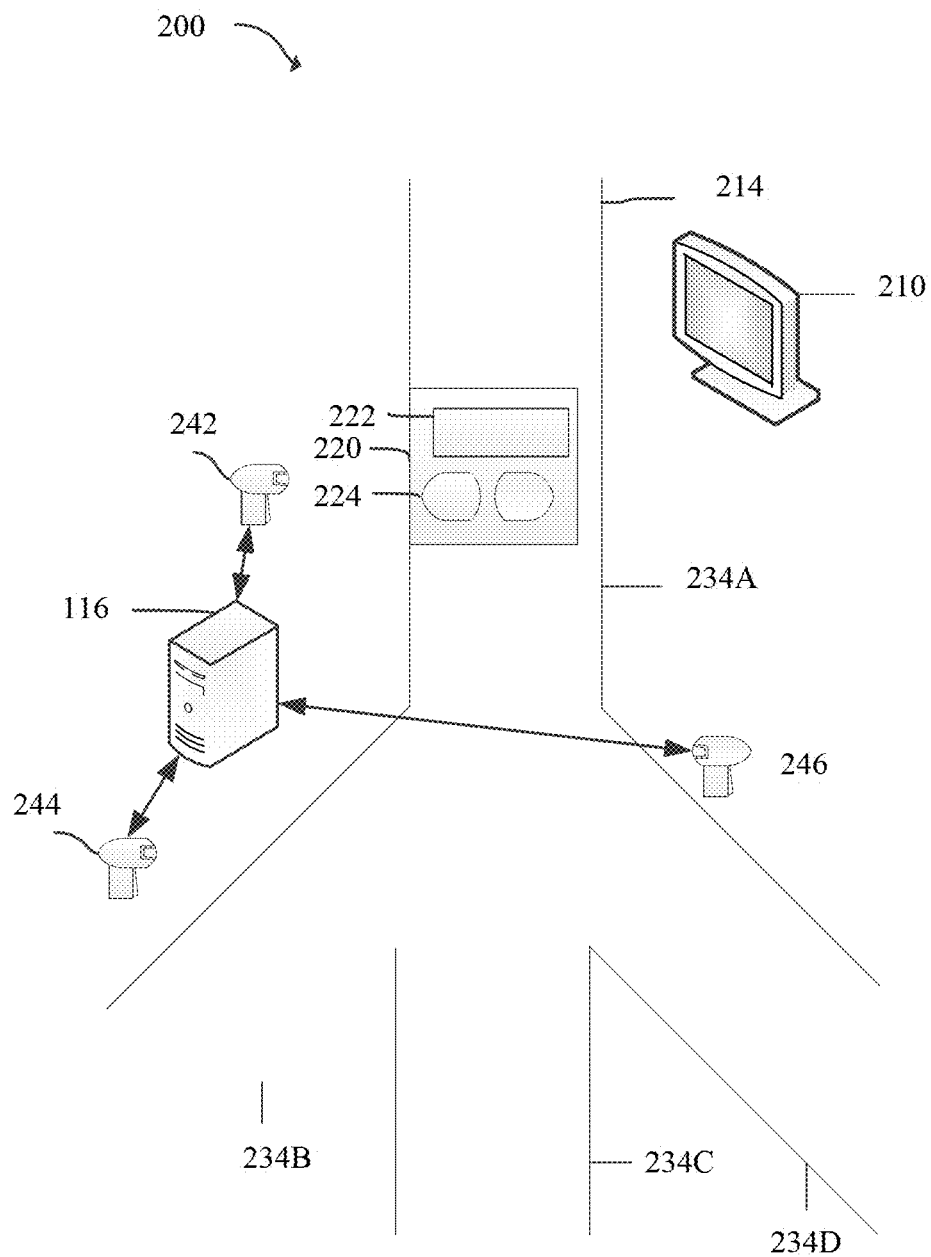
FIG. 2 is a schematic view of an order processing facility, where the order processing system of FIG. 1 is deployed proximate a production line to process eyewear products traveling along the production line in accordance with one embodiment.

The order processing system 116 of FIG. 1 may also process pre-existing eyewear orders while the pre-existing eyewear orders are being completed. FIG. 2 is a schematic view of an order processing facility 200, where the order processing system 116 of FIG. 1 is deployed proximate a production line 214 to process eyewear products traveling along the production line 214 in accordance with one embodiment. As defined herein, the production line 214 includes a set of paths an eyewear product or components thereof travel on while the eyewear product is being assembled. The production line 214 may be formed from one continuous production path, from multiple continuous production paths that converge at one or more junctions, or from multiple non-continuous production paths. In some embodiments, the production line 214 is connected by one or more assembly belts or other mechanisms operable to transport the eyewear product and/or components thereof along the production line or between non-continuous production paths. In the depicted embodiment, the production line 215 includes a first production path 234A that splits into second, third, and fourth production paths 234B-234D, where different operations are performed along each of the second, third, and fourth production paths 234B-234D. As described herein, the order processing system 116 is operable to direct eyewear product orders traveling along the first production path 234A to one of the second, third, and fourth production paths 234B-234D. The eyewear product may be removed from the production line by operators or by machinery at different processing points of the production line 214. Moreover, operators may operate at different processing points of the production line 214 to inspect, assemble, disassemble, perform quality control, or perform other operation described herein on the eyewear product.

The production line 214 transports a tray 220 carrying a set of optical lenses of a first eyewear product 224 and a label 222 of the first eyewear product 224. As described herein, a physical copy of the label 222 may be generated by the order processing system 116, a similar processing system deployed along the production line 214, or may be written by an operator. The label is placed on the tray 220 or affixed to the first eyewear product 224 during the assembly process to identify the first eyewear product 224 and to track the status of the first eyewear product 224. In some embodiments, the order processing system 116 is also communicatively connected to a first sensor 242, a second sensor 244, and a third sensor 246 that are deployed along the first processing path 234A, the second processing path 234B, and the fourth processing path 234D of the production line 214, respectively. The first, second and third sensors 242, 244, and 246 may be any electronic device that is operable to scan the label 222 to obtain identification information of the first eyewear product 214. Examples of the first, second, and third sensors 242, 244, and 246 may include barcode scanners, stock keeping unit ("SKU") scanners, near field communication ("NFC") detectors, radio frequency identification ("RFID") identification detectors, video cameras, optical character recognition ("OCR") devices, as well as other similar hardware components operable to obtain the identification information of the first eyewear product 224 based on the label 222. In one of such embodiments, each of the first, second, and third sensors 242, 244, and 246 is operable to automatically scan the label 222 of the first eyewear product 224 and provide the identification information of the first eyewear product 224 to the processing system 116. In one of more of such embodiments, the operator working at the first processing path manually holds the first scanner 232 over the label 222 to obtain the identification information of the first eyewear product 224.

The order processing system 116 is operable to associate the label 222 with the first eyewear product 224 based on the identification information and is operable to perform operations described herein to obtain up-to-date order information of the first eyewear product 224. The order processing system 116 is also operable to provide the up-to-date order information of the first eyewear product 224 for display on a display screen 210 that is deployed along the production line 214. In some embodiments, the order processing system 116 is also operable to provide additional information that may assist the operator to assemble the first eyewear product 224 for display on the display screen 210. For example, as the first eyewear product 224 travels along a first production path 234A of the production line 214, the first scanner 242 scans the label 222 of the first eyewear product 224 and provides the identification information of the first eyewear product 224 to the order processing system 116. The order processing system 116 obtains up-to-date order information as well other information described herein and provides such information for display on the display screen 210.

In some embodiments, the processing system 116 is further operable to dynamically update the order information, the status of the first eyewear product 224, as well as other information associated with the first eyewear product 224 while the operator is assembling the first eyewear product 224. For example, if the operator working along the first production path 234A fits lenses of the first eyewear product 224 onto a frame of the first eyewear product 224, then current status of the first eyewear product 224 is dynamically updated, is stored on the storage medium 118, and is provided for display on the electronic display 210. In one of such embodiments, additional information, such as the estimated time until completion, the next step in the process to assemble the first eyewear product 224, as well as other useful information indicative of the status of the first eyewear product 224 are updated and are stored on the storage medium 118 and/or are provided for display on the electronic display 210. In one or more of such embodiments, content of the label 222 is electronically displayed on an electronic display (not shown) that is placed on the tray 220. In such embodiments, the order processing system 116 is operable to dynamically update the content of the label 222 and to provide up-to-date content for display on the electronic display. In further embodiments, the foregoing information related to the first eyewear product 224 is manually updated by the operator.

In some embodiments, the order processing system 116 is operable to direct the product flow of the first eyewear product 224 along different paths of the production line 214. For example, if the product processing system 116 determines that the first eyewear product 224 has not been completely assembled, then then the order processing system 116 directs the first eyewear product 224 to travel along the second production path 234B, which transports the first eyewear product to another area of the processing facility 200 to continue the assembly process of the first eyewear product 224. If the product processing system 116 determines that the first eyewear product 224 has been completely assembled, then the order processing system 116 directs the first eyewear product 224 to travel along the third production path 234C, which transports the first eyewear product 224 to an area of the processing facility 200 where assembled eyewear products are packaged for shipping. If the product processing system 116 determines that an error has been made while assembling the first eyewear product 224, then the order processing system 116 directs the first eyewear product 224 to travel along the fourth production path 234D, which transports the first eyewear product to a troubleshooting area of the processing facility 200, where the first eyewear product 224 may be examined by the operator. The second and the third sensors are placed along the second and fourth production paths 234B and 234D, respectively, and are operable to provide identification information of the first eyewear product 224 to the product processing system 116 as the first eyewear product 224 travels along the second or fourth production paths 234B and 234D, respectively.

In some embodiments, multiple eyewear products travel along the production line 214 and the order processing system 116 is operable to determine, based on rules described herein, queue positions of the multiple eyewear products that travel along the production line 214 and are operable to rearrange the positions of the eyewear products along the production line based on the queue positions of the eyewear products.

Figure 3:
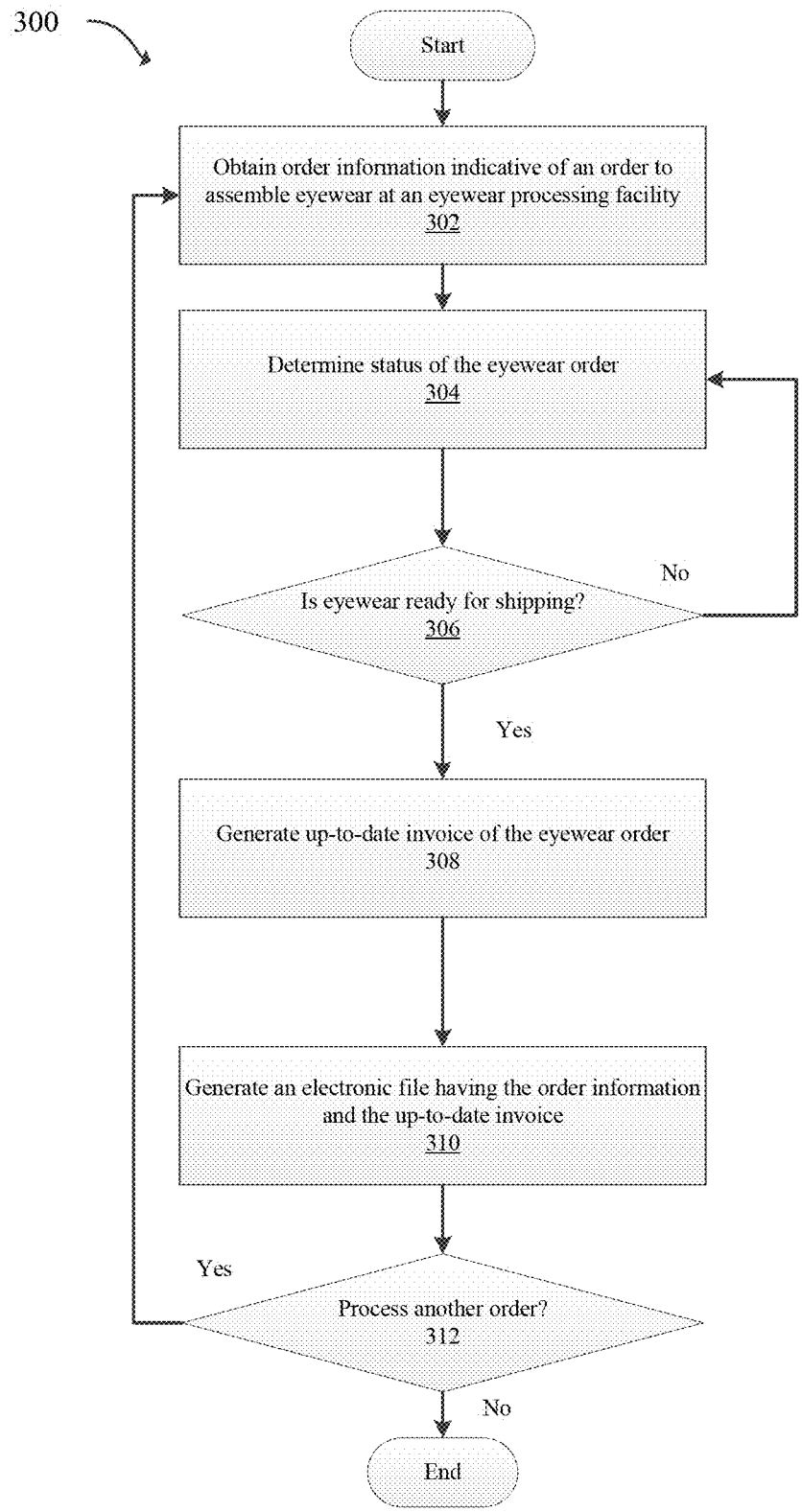
FIG. 3 is a flowchart illustrating a process to process eyewear orders in accordance with one embodiment.

FIG. 3 is a flowchart illustrating a process 300 to process eyewear orders in accordance with one embodiment. Although operations in the process 300 are shown in a particular sequence, certain operations may be performed in different sequences or at the same time where feasible. Further, although the following paragraphs describe performing the process 300 to process eyewear orders, the process 300 may also be performed to process orders of non-optical products.

The process 300 starts when order information indicative of an order to assemble eyewear is transmitted to the order processing system 116. As described herein, the order information includes any information indicative of an eyewear product order, such as an order number, order date, account number, customer name, customer address, customer telephone number, customer username, lens style, lens color, lens material, frame composition, frame identification, courier identification, as well as other relevant information described herein. In some embodiments, the order information is transmitted from an origination facility or from a third party vendor directly to the order processing system 116. In one or more embodiments, the order information is transmitted along one or more nodes of the server 108 before the order information is received by the order processing system 116.

At step 302, the order processing system 116 obtains the order information. At step 304, the order processing system 116 determines the status of the eyewear order. As described herein, the order processing system 116 is operable to determine the status of the eyewear order at multiple stages of eyewear assembly process. In some embodiments, a label indicative of the eyewear order is generated and is placed proximate to components of the eyewear order during eyewear assembly. The order processing system 116 is operable to communicate with one or more scanners deployed along a production line to determine the status of the eyewear order. In one or more of such embodiments, the label also contains content indicative of the order information and other information related to the eyewear order. In one or more of such embodiments, content of the label is displayed on an electronic display that is displayed along the production line, proximate the eyewear product, or at another location within the processing facility. Further, the content of the label may be dynamically updated by the order processing system 116 while the eyewear product in being assembled.

In some embodiments, the order processing system 116 is further operable to dynamically direct the eyewear order along different production paths of the production line. In one of such embodiments, the order processing system 116, upon determining the current status of the eyewear order, determines which operations are needed to complete the eyewear order, and directs the eyewear order along a production path to continue the process to assemble the eyewear product.

At step 306, if the order processing system 116 determines that the eyewear order is ready for shipping, then the process continues to step 308. Alternatively, if the order processing system 116 determines that the eyewear order is not ready for shipping, then the process returns to step 304, where the order processing system 116 again determines the status of the eyewear order. In that regard, the order processing system 116 is operable to periodically and/or continuously determine the status of the eyewear order until the eyewear order is ready for shipping. In some embodiments, the order processing system 116 is also operable to determine a condition of the eyewear if the eyewear is not ready for shipping and generate an indication of the condition of the eyewear. The order processing system 116 then transmits the indication of the condition to an operator fulfilling the eyewear order and/or to the origination facility that generated the order to provide additional up-to-date status report of the eyewear order.

At step 308, the order processing system 116 generates an-up-to-date invoice of the eyewear order. In some embodiments, the order processing system 116 obtains a predetermined price for the eyewear order and determines whether any price adjustments should be applied to the predetermined price. For example, the order processing system 116 is operable to reach out to third party systems to obtain promotional rates, rebates, fees, shipping charges, as well as other applicable adjustments that should be applied to the predetermined price. The order processing system 116 then applies all of the applicable adjustments to the predetermined price. In some embodiments, the order processing system 116 is further operable to transmit a copy of the generated invoice to the customer of the eyewear order. At step 310, the order processing system 116 generates an electronic file containing the order information and the up-to-date invoice for the eyewear order. The order processing system 116 then transmits the generated electronic file to origination facilities that the eyewear order originated from. As described herein, the order processing system 116 may directly transmit the generated electronic file to the origination facility. The generated electronic file may also be transmitted along one or more hops of the server 108 before the electronic file reaches the origination facility. In some embodiments, the order processing system 116 formats the electronic file into a format that is compatible with one or more electronic devices deployed at the origination facility.

At step 312, the order processing system 116 determines whether another eyewear order should be processed. The process 300 returns to step 302 if another eyewear order should be processed, and the order processing system 116 obtains order information of the other eyewear order. In some embodiments, the order processing system 116 simultaneously processes multiple eyewear orders. In one of such embodiments, the eyewear orders are generated by electronic devices deployed at different origination facilities. In one of such embodiments, the order processing system 116 is operable to arrange a processing queue for the multiple eyewear orders. Moreover, the order processing system 116 is operable to rearrange the processing queue to accommodate changes to the order information of the eyewear orders. As such, the order processing system 116 described herein is operable to not only handle multiple eyewear orders generated by multiple origination facilities, but is also operable to dynamically update the status of each of the multiple eyewear orders, and to provide up-to-date order information and pricing information of each eyewear order to operators fulfilling the eyewear orders as well as the originating facility that generated the order. The process 300 ends if the order processing system 116 determines at step 312 no additional eyewear order needs to be processed.

As used in this specification and any claims of this application, the terms "computer", "server", "processor", and "memory" all refer to electronic or other technological devices. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

The above disclosed embodiments have been presented for purposes of illustration and to enable one of ordinary skill in the art to practice the disclosed embodiments, but is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/blocks may be performed in parallel or out of sequence, or combined into a single step/block. The scope of the claims is intended to broadly cover the disclosed embodiments and any such modification. Further, the following clauses represent additional embodiments of the disclosure and should be considered within the scope of the disclosure:

Clause 1, a computer-implemented method to process of an order to assemble eyewear, the method comprising obtaining order information indicative of an order to assemble an eyewear at an eyewear processing facility, wherein the order is first received at an order origination facility remote from the processing facility; determining a status of the order; generating an up-to-date invoice of the order if the eyewear is ready for shipping; and generating an electronic file comprising the order information and the up-to-date invoice of the eyewear.

Clause 2, the computer-implemented method of clause 1, further comprising simultaneously processing the order with at least one additional orders to assemble at least one additional eyewear, wherein the order and the at least one additional orders are received at different order origination facilities that are remote from the processing facility.

Clause 3, the computer-implemented method of clause 1 or 2, further comprising arranging a processing queue of the order with respect to processing queues of the at least one additional orders based on the order information of the eyewear.

Clause 4, the computer-implemented method of one of clauses 1-3, wherein generating the up-to-date invoice of the eyewear comprises determining a base price of the eyewear; obtaining one or more qualifying promotions; and applying the one or more qualifying promotions to the base price of the eyewear.

Clause 5, the computer-implemented method of one of clauses 1-4, wherein generating the up-to-date invoice of the eyewear further comprises: obtaining, from at least one external system, tax and shipping cost of the eyewear; and applying the tax and shipping cost of the eyewear to the base price of the eyewear.

Clause 6, the computer-implemented method of one of clauses 1-5, wherein at least one component of the eyewear is supplied by a third party vendor, and wherein generating the up-to-date invoice of the eyewear comprises querying the third party vendor for pricing information and qualifying promotions of the at least one component, wherein the up-to-date invoice of the eyewear is generated based on the pricing information and the qualifying promotions of the at least one component.

Clause 7, the computer-implemented method of one of clauses 1-6, further comprising: dynamically generating a billing statement comprising the up-to-date invoice of the order; and transmitting the billing statement to a wearer of the eyewear.

Clause 8, the computer-implemented method of one or clauses 1-7, further comprising generating a label indicative of the order information of the eyewear.

Clause 9, the computer-implemented method of one of clauses 1-8, wherein generating the electronic file comprises: obtaining information indicative of at least one of a lens style, lens color, lens coating, and lens material of lenses of the eyewear; and storing the information indicative of the at least one of the lens style, lens color, lens coating, and lens material of the lenses of the eyewear on the electronic file.

Clause 10, the computer-implemented method of one of clauses 1-9, wherein generating the electronic file comprises obtaining prescription information of a wearer of the eyewear; and storing the prescription information of the wearer on the electronic file.

Clause 11, the computer-implemented method of one of clauses 1-10, further comprising: determining a condition of the eyewear if the eyewear is not ready for shipping; and generating an indication of the condition of the eyewear.

Clause 12, an order processing system, comprising a storage medium comprising order information indicative of an order to assemble an eyewear at an eyewear processing facility; and a processor operable to: determine a status of the order; query at least one remote system communicatively connected to the order processing system to obtain up-to-date pricing information of the eyewear; generate an up-to-date invoice of the order based on the up-to-date pricing information if the eyewear is ready for shipping; generate an electronic file comprising the order information and the up-to-date invoice of the eyewear; and provide the electronic file to an order origination facility where the order is first received.

Clause 13, the system of one or more of clause 12, wherein the processor is further operable to communicate with different order origination facilities that are remote from the processing facility to simultaneously process at least one additional orders to assemble at least one additional eyewear.

Clause 14, the system of clause 12 or 13, the processor is further operable to: determine a base price of the eyewear; obtain one or more qualifying promotions; and apply the one or more qualifying promotions to the base price of the eyewear to generate the up-to-date invoice of the order.

Clause 15, a non-transitory machine-readable medium comprising instructions stored therein, which when executed by one or more processors, causes the one or more processors to perform operations comprising: obtaining a first order information indicative of a first order to assemble a first eyewear at an eyewear processing facility, wherein the first order is first received at a first order origination facility remote from the processing facility; obtaining a second order information indicative of a second order to assemble a second eyewear at the eyewear processing facility, wherein the second order is first received at a second order origination facility remote from the first order origination facility and the first order processing facility; determining statuses of the first order and the second order; generating a first invoice of the first order if the first eyewear is ready for shipping; generating a second invoice of the second order if the first eyewear is ready for shipping; and generating a first and a second electronic file comprising the order information and the first invoice and the second invoice, respectively; and arranging a processing queue of the first order relative to the second order based on the status and the order information of the first order relative to the second order.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A computer-implemented method to process of an order to assemble eyewear, the method comprising:
    obtaining order information indicative of an order to assemble an eyewear by an order processing system at an eyewear processing facility, wherein the order is first received at an order origination facility remote from the processing facility, wherein the order processing system controls a conveyor belt to transport components of the eyewear to a processing point within the processing facility to assemble the eyewear, and wherein the order processing system is commutatively connected to sensors deployed along a processing path, wherein the order processing system includes the order information enabling multiple different electronic devices to derive rules for arranging eyewear order queue positions;
    determining a status of the orders by the order processing system;
    generating labels indicative of order information of each eyewear by the order processing system, wherein the labels include optical machine-readable representations and content of the labels is dynamically updated while the eyewear is being assembled, wherein the labels are scanned by the sensors;
    generating an up-to-date invoice of the order when the eyewear is ready for shipping; and
    generating an electronic file comprising the order information and the up-to-date invoice of the eyewear,
    wherein the electronic file has a predetermined format that is compatible with at least one electronic device deployed at the order origination facility that transmitted the order to assemble the eyewear.

2. The computer-implemented method of claim 1, further comprising:
    simultaneously processing the order with at least one additional orders to assemble at least one additional eyewear,
    wherein the order and the at least one additional orders are received at different order origination facilities that are remote from the processing facility.

3. The computer-implemented method of claim 2, further comprising arranging a processing queue of the order with respect to processing queues of the at least one additional orders based on the order information of the eyewear.

4. The computer-implemented method of claim 1, wherein generating the up-to-date invoice of the eyewear comprises:
    determining a base price of the eyewear;
    obtaining one or more qualifying promotions; and
    applying the one or more qualifying promotions to the base price of the eyewear.

5. The computer-implemented method of claim 4, wherein generating the up-to-date invoice of the eyewear further comprises:
    obtaining, from at least one external system, tax and shipping cost of the eyewear; and
    applying the tax and shipping cost of the eyewear to the base price of the eyewear.

6. The computer-implemented method of claim 4, wherein at least one component of the eyewear is supplied by a third party vendor, and wherein generating the up-to-date invoice of the eyewear comprises:
    querying the third party vendor for pricing information and qualifying promotions of the at least one component,
    wherein the up-to-date invoice of the eyewear is generated based on the pricing information and the qualifying promotions of the at least one component.

7. The computer-implemented method of claim 1, further comprising:
    dynamically generating a billing statement comprising the up-to-date invoice of the order; and
    transmitting the billing statement to a wearer of the eyewear.

8. The computer-implemented method of claim 1, wherein generating the electronic file comprises:
    obtaining information indicative of at least one of a lens style, lens color, lens coating, and lens material of lenses of the eyewear; and
    storing the information indicative of the at least one of the lens style, lens color, lens coating, and lens material of the lenses of the eyewear on the electronic file.

9. The computer-implemented method of claim 1, wherein generating the electronic file comprises:
    obtaining prescription information of a wearer of the eyewear; and
    storing the prescription information of the wearer on the electronic file.

10. The computer-implemented method of claim 1, further comprising:
    determining a condition of the eyewear if the eyewear is not ready for shipping; and
    generating an indication of the condition of the eyewear.

11. The computer-implemented method of claim 1, further comprising: assembling multiple eyewear based on multiple orders.

12. The computer-implemented method of claim 1, wherein the labels are attached proximate to components of multiple orders.

13. The computer-implemented method of claim 1, wherein the optical machine-readable representations are readable by an optical scanner.

14. The computer-implemented method of claim 1, wherein the electronic file is formatted in different formats compatible with a plurality of different electronic devices deployed at the order origination facility that transmitted the order to assemble the eyewear.

15. The computer-implemented method of claim 1, wherein the electronic file has the predetermined format that is compatible with a plurality of electronic devices deployed at the order origination facility that transmitted the order to assemble the eyewear.

16. The computer-implemented method of claim 1, wherein the electronic file further includes prescription information of a wearer.

17. The computer-implemented method of claim 1, wherein the electronic file has a predetermined format that is compatible with multiple different electronic devices deployed at the order origination such that the electronic file has a unique format that is based on predetermined preferences while maintaining compatibility with the multiple different electronic devices and including up-to-date status and order information of the eyewear order.

18. An order processing system, comprising:
a storage medium comprising order information indicative of an order to assemble an eyewear at an eyewear processing facility, wherein the order information enables multiple different electronic devices to derive rules for arranging eyewear order queue positions; and
a processor operable to:
control a conveyor belt to transport components of the eyewear to a processing point within the processing facility to assemble the eyewear;
commutatively connect the order processing system is to sensors deployed along a processing path;
determine a status of the orders;
query at least one remote system communicatively connected to the order processing system to obtain up-to-date pricing information of the eyewear;
generate labels indicative of order information of each eyewear, wherein the labels include optical machine-readable representations and content of the labels is dynamically updated while the eyewear is being assembled, wherein the labels are scanned by the sensors;
generate an up-to-date invoice of the order based on the up-to-date pricing information when the eyewear is ready for shipping;
generate an electronic file comprising the order information and the up-to-date invoice of the eyewear; and
provide the electronic file to an order origination facility where the order is first received,
wherein the electronic file has a predetermined format that is compatible with at least one electronic device deployed at the order origination facility that transmitted the order to assemble the eyewear.

19. The system of claim 18, wherein the processor is further operable to communicate with different order origination facilities that are remote from the processing facility to simultaneously process at least one additional orders to assemble at least one additional eyewear.

20. The system of claim 18, the processor is further operable to:
determine a base price of the eyewear;
obtain one or more qualifying promotions; and
apply the one or more qualifying promotions to the base price of the eyewear to generate the up-to-date invoice of the order.

21. A non-transitory machine-readable medium comprising instructions stored therein, which when executed by one or more processors, causes the one or more processors to perform operations comprising:
obtaining a first order information indicative of a first order to assemble a first eyewear at an eyewear processing facility, wherein the first order is first received at a first order origination facility remote from the processing facility;
obtaining a second order information indicative of a second order to assemble a second eyewear by an order processing system at the eyewear processing facility, wherein the second order is first received at a second order origination facility remote from the first order origination facility and the first order processing facility, wherein the order processing system includes the order information enabling multiple different electronic devices to derive rules for arranging eyewear order queue positions, wherein the order processing system is operable to control a conveyor belt to transport components of the eyewear to a processing point within the processing facility to assemble the eyewear, and wherein the order processing system is commutatively connected to sensors deployed along a processing path;
determining statuses of the first order and the second order;
generating labels indicative of the first and the second orders, wherein the labels include optical machine-readable representations and content of the labels is dynamically updated while the eyewear is being assembled, wherein the labels are scanned by the sensors;
generating a first invoice of the first order when the first eyewear is ready for shipping;
generating a second invoice of the second order when the first eyewear is ready for shipping; and
generating a first and a second electronic file comprising the order information and the first invoice and the second invoice, respectively; and
arranging a processing queue of the first order relative to the second order based on the status and the order information of the first order relative to the second order,
wherein the electronic file has a predetermined format that is compatible with at least one electronic device deployed at the order origination facility that transmitted the order to assemble the eyewear.

* * * * *